(12) United States Patent
Chen

(10) Patent No.: US 6,787,606 B1
(45) Date of Patent: Sep. 7, 2004

(54) ELECTROCHROMIC DEVICE WITH COMPOSITION OF EPOXY RESIN, TOUGHENER AND LATENT CURATIVE

(75) Inventor: Chunfu Chen, Yokohama (JP)

(73) Assignee: Henkel Corporation, Rocky Hill, CT (US)

( * ) Notice: Subject to any disclaimer, the term of this patent is extended or adjusted under 35 U.S.C. 154(b) by 18 days.

(21) Appl. No.: 10/242,784

(22) Filed: Sep. 13, 2002

Related U.S. Application Data

(63) Continuation of application No. 09/895,081, filed on Jul. 2, 2001, now abandoned.

(51) Int. Cl.$^7$ .............................. C08K 3/36; C08L 63/00; C08L 63/02; C08L 63/04; G02F 1/15
(52) U.S. Cl. ..................... 525/113; 359/265; 359/267; 359/275; 428/1.53; 523/434; 525/65; 525/92 H; 525/111; 525/114; 525/118; 525/120
(58) Field of Search .................. 428/1.53; 501/13; 523/434; 525/65, 92 H, 111, 113, 114, 118, 120; 359/265, 267, 275

(56) References Cited

U.S. PATENT DOCUMENTS

| | | | | |
|---|---|---|---|---|
| 3,280,701 A | | 10/1966 | Donnelly et al. ............... 88/77 |
| 3,451,741 A | | 6/1969 | Manos ......................... 350/160 |
| 3,453,038 A | | 7/1969 | Kissa et al. .................. 350/160 |
| 3,806,229 A | | 4/1974 | Schoot et al. ................ 350/160 |
| 4,440,910 A | | 4/1984 | O'Connor ..................... 525/295 |
| 4,712,879 A | | 12/1987 | Lynam et al. ................. 350/357 |
| 4,761,061 A | | 8/1988 | Nishiyama et al. ........... 350/357 |
| 4,902,108 A | | 2/1990 | Byker ........................... 350/357 |
| 5,066,112 A | * | 11/1991 | Lynam et al. ................. 359/267 |
| 5,073,012 A | | 12/1991 | Lynam ......................... 359/265 |
| 5,115,346 A | | 5/1992 | Lynam ......................... 359/604 |
| 5,128,799 A | | 7/1992 | Byker ........................... 359/265 |
| 5,140,455 A | | 8/1992 | Varaprasad et al. .......... 359/275 |
| 5,142,407 A | | 8/1992 | Varaprasad et al. .......... 359/276 |
| 5,151,816 A | | 9/1992 | Varaprasad et al. .......... 359/275 |
| 5,239,405 A | | 8/1993 | Varaprasad et al. .......... 359/272 |
| 5,360,837 A | * | 11/1994 | Honda et al. ................ 523/220 |
| 5,567,749 A | * | 10/1996 | Sawamura et al. .......... 523/443 |
| 6,063,839 A | * | 5/2000 | Oosedo et al. ............... 623/206 |
| 6,166,849 A | | 12/2000 | Coleman et al. ............. 359/270 |
| 6,361,879 B1 | * | 3/2002 | Tsutsumi et al. ............ 428/620 |
| 6,521,354 B1 | * | 2/2003 | Shimizu et al. .............. 428/620 |
| 6,535,322 B2 | * | 3/2003 | Asano et al. ................ 359/269 |
| 6,555,187 B1 | * | 4/2003 | Kitamura .................... 428/1.53 |
| 6,620,510 B1 | * | 9/2003 | Taguchi et al. .............. 428/413 |

FOREIGN PATENT DOCUMENTS

| | | | | |
|---|---|---|---|---|
| JP | 61-223024 A | * | 10/1986 |
| JP | 8-67804 A | * | 3/1996 |
| JP | 8867804 | | 3/1996 |
| JP | 9-137044 A2 | * | 5/1997 |
| JP | 2001-294843 A2 | * | 10/2001 |
| JP | 2002-69413 A2 | * | 3/2002 |

OTHER PUBLICATIONS

Chemical abstracts registry No. 2530–83–8 for gamma–glycidoxypropyltrimethoxysilane, 1967.*
Chemical abstracts registry No. 30420–32–7 for a dicyclopentadiene–epichlorohydrin–phenol copolymer, 1992.*
Chemical abstracts registyr No. 119345–05–0 for a dicyclopentadiene–phenol copolymer, 1992.*

* cited by examiner

*Primary Examiner*—Robert Sellers
(74) *Attorney, Agent, or Firm*—Steven C. Bauman

(57) ABSTRACT

A composition useful as a sealing element for electrochromic devices comprises (a) an epoxy resin component including at least two of a dicyclopentadiene epoxy resin, a naphthalene epoxy resin, a bisphenol A epoxy resin, a bisphenol F epoxy resin and a novolac epoxy resin;

(b) a toughening agent; and (c) a latent curative.

14 Claims, 2 Drawing Sheets

ELECTROCHROMIC DEVICE WITH COMPOSITION OF EPOXY RESIN, TOUGHENER AND LATENT CURATIVE

This application is a continuation of application Ser. No. 09/895,081 filed Jul. 2, 2001, abandoned.

BACKGROUND OF THE INVENTION

1. Field of the Invention

The present invention relates to epoxy-based compositions, particularly well suited for sealing reversibly variable electrochromic devices which are designed to vary the transmittance to light, such as electrochromic rearview mirrors, windows and sun roofs for motor vehicles, and reversibly variable electrochromic elements therefor.

2. Brief Description of the Related Technology

Reversibly variable electrochromic devices are known, in which the intensity of light (e.g., visible, infrared, ultraviolet or other distinct or overlapping electromagnetic radiation) is modulated by passing the light through an electrochromic medium. The electrochromic medium is disposed between two conductive electrodes, at least one of which is typically transparent, which causes the medium to undergo reversible electrochemical reactions when potential differences are applied across the two electrodes. Some examples of these devices are described in U.S. Pat. No. 3,280,701 (Donnelly); U.S. Pat. No. 3,451,741 (Manos); U.S. Pat. No. 3,806,229 (Schoot); U.S. Pat. No. 4,712,879 (Lynam); and U.S. Pat. No. 4,902,108 (Byker).

Reversibly variable electrochromic media include those wherein the electrochemical reaction takes place in a solid film or occurs entirely in a liquid solution. Many devices using an electrochromic medium, where the electrochemical reaction takes place entirely in a solution, are known. Some examples are described in U.S. Pat. No. 3,453,038 (Kissa); U.S. Pat. No. 5,073,012 (Lynam); U.S. Pat. No. 5,115,346 (Lynam); U.S. Pat. No. 5,128,799 (Byker); U.S. Pat. No. 5,140,455 (Varaprasad); U.S. Pat. No. 5,142,407 (Varaprasad); U.S. Pat. No. 5,151,816 (Varaprasad); U.S. Pat. No. 5,239,405 (Varaprasad); Manos; and Schoot.

The solution often includes a solvent, an anodic electrochromic compound and a cathodic electrochromic compound. During operation of such devices, the solution is fluid, although it may be gelled or made highly viscous with a thickening agent, and the solution components, including the anodic electrochromic compounds and cathodic electrochromic compounds, do not precipitate. See e.g., Byker.

One problem often encountered with such electrochromic devices is degradation of the sealing element. Degradation may be due to chemical degradation as a result of prolonged contact (particularly during use) with the components of the electrochromic media, which are oftentimes acidic in nature and/or solvents. Degradation may also be caused by environmental exposure, which is common in use.

U.S. Pat. No. 4,761,061 (Nishiyama) speaks to sealing materials such as: thermoplastic resins (e.g., polyethylene, polypropylene, polyester, polystyrene, polyvinyl chloride, ethylene vinyl acetate, ionomer, ethylene ethyl acrylate, polyvinylidene chloride, ethylene acrylate, nylon, polycarbonate, polyethylene fluoride, and the like; thermosetting, photo-curable, or electron-beam-setting resins (e.g., epoxy, silicone, melamine, unsaturated polyester, polyester acrylate, and the like; various inorganic materials (e.g., glass, silica, alumina, titanina, and the like); and mixtures of these materials.

In addition, it is known in the field of cyanoacrylate adhesives to include rubber-toughening agents, such as VAMAC, in the adhesive composition to increase the strength of the cured adhesive product. See U.S. Pat. No. 4,440,910 (O'Connor).

Notwithstanding the above, it would be desirable to provide an epoxy-based composition, such as one for use as a sealing element, that is better able to withstand the chemical rigors to which it will be exposed in use, as well as the environmental weathering that occurs over time in use.

SUMMARY OF THE INVENTION

The present invention provides epoxy-based compositions, including an epoxy resin component, at least a portion of which comprises at least two of dicyclopentadiene type epoxy resin, reaction products of 1,6-dihydroxy-napthalene with epichlorohydrin, bisphenol A type epoxy resin, bisphenol F type epoxy resin, and novaloc type epoxy resin, a rubber toughening agent and a latent curing agent. The compositions are extremely well-suited to commercial applications, like sealing elements in the manufacture and use of electrochromic devices. Such electrochromic devices include electrochromic mirrors—e.g., vehicular, for instance, truck mirrors, particularly large area truck mirrors, automotive interior and exterior mirrors, architectural or specialty mirrors, like those useful in periscopic or dental and medical applications; electrochromic glazings—e.g., architectural, such as those useful in the home, office or other edifice, aeronautical glazings, such as those useful in aircraft, or vehicular glazings, for instance, windows, such as windshields, side windows and backlights, sun roofs, sun visors or shade bands and optically attenuating contrast filters, such as contrast enhancement filters, suitable for use in connection with cathode ray tube monitors and the like; electrochromic privacy or security partitions; electrochromic solar panels, such as sky lights; electrochromic information displays; electrochromic lenses and eye glass.

The present invention also provides electrochromic devices manufactured using the inventive epoxy-based compositions, such as those referred to above, particularly rearview mirrors, windows and sun roofs for automobiles, which devices possess a sealing element stable to autoclave conditions.

DETAILED DESCRIPTION OF THE INVENTION

Figure 1:
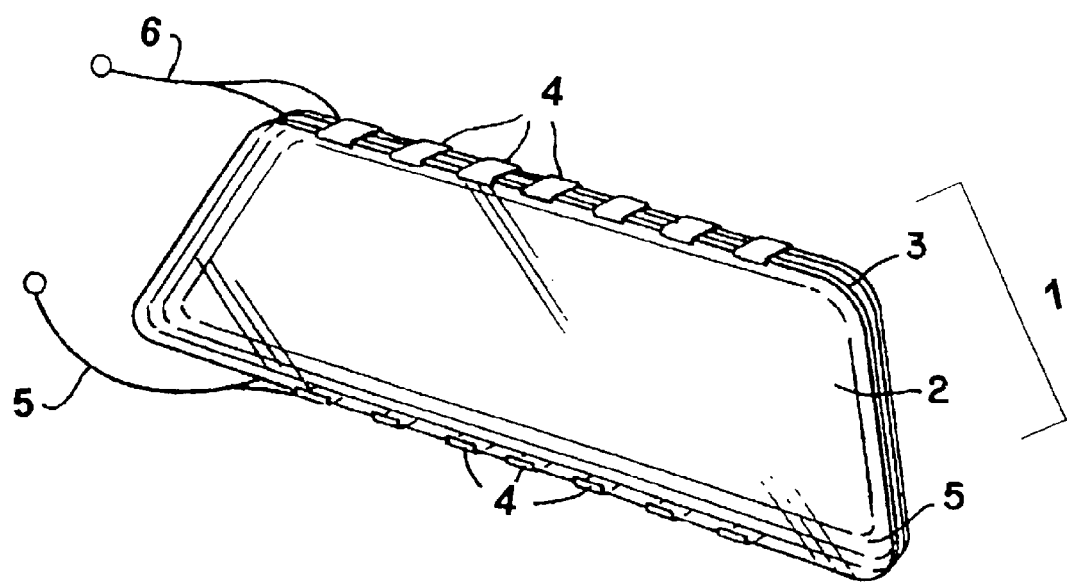
FIG. 1 depicts a perspective view of an electrochromic device employing an epoxy-based composition according to the present invention to form the main seal of the device.

As noted above, the inventive compositions include an epoxy resin component, at least a portion of which comprises at least two of dicyclopentadiene type epoxy resin, reaction products of 1,6-dihydroxy-naphthalene with epichlorohydrin, bisphenol A type epoxy resin, bisphenol F type epoxy resin, and novoloc type epoxy resin.

The epoxy resin component may also include any common epoxy resin, like a multifunctional epoxy resin, though a monofunctional epoxy resin may also be included.

The epoxy resin component should be present in the composition in an amount within the range of about 10% by weight to about 75% by weight, desirably about 20% by weight to about 60% by weight, such as about 40% by weight to about 50% by weight, based on the total weight of the composition.

Examples of such a multifunctional epoxy resin include bisphenol-A-type epoxy resin [such as EPICLON EXA-830 LVP (CAS No. 25068-38-6) or EPICLON EXA-850 CRP], bisphenol-F-type epoxy resin (such as RE-403-S from Nippon Kayaku, Japan), phenol novolac-type epoxy resin [such as the copolymer of the glycidyl ether of phenol and formaldehyde, available commercially under the tradename "EPOTOHTO" YDPN-638 (CAS No. 28064-14-4), from Tohto Kasei Co., Ltd.] and cresol novolac-type epoxy from resin (such as "ARALDITE" ECN 1871 from Ciba Specialty Chemicals, Hawthorne, N.Y.).

Other suitable epoxy resins include polyepoxy compounds based on aromatic amines and epichlorohydrin, such as N,N,N',N'-tetraglycidyl-4,4'-diaminodiphenyl methane; N-diglycidyl-4-aminophenyl glycidyl ether; and N,N,N',N'-tetraglycidyl-1,3-propylene bis-4-aminobenzoate.

Among the epoxy resins suitable for use herein also include polyglycidyl derivatives of phenolic compounds, such as those available commercially under the tradename "EPON", such as "EPON" 828, "EPON" 1001, "EPON" 1009, and "EPON" 1031 from Shell Chemical Co.; "DER" 331, "DER" 332, "DER" 334, and "DER" 542 from Dow Chemical Co.; and "BREN-S" from Nippon Kayaku. Other suitable epoxy resins include polyepoxides prepared from polyols and the like and polyglycidyl derivatives of phenol-formaldehyde novolacs, the latter of which are available commercially under the tradename "DEN", such as "DEN" 431, "DEN" 438, and "DEN" 439 from Dow Chemical. Cresol analogs are also available commercially under the tradename "ARALDITE", such as "ARALDITE" ECN 1235, "ARALDITE" ECN 1273, and "ARALDITE" ECN 1299 from Ciba Specialty Chemicals. SU-8 is a bisphenol-A-type epoxy novolac available from Interez, Inc. Polyglycidyl adducts of amines, aminoalcohols and polydarboxylic acids are also useful, commercially available resins of which include "GLYAMINE" 135, "GLYAMINE" 125, and "GLYAMINE" 115 from F.I.C. Corporation; "ARALDITE" MY-720, "ARALDITE" 0500, and "ARALDITE" 0510 from Ciba Specialty Chemicals and PGA-X and PGA-C from the Sherwin-Williams Co.

One particularly desirable epoxy resin for use herein includes a dicyclopentadienyl type epoxy resin (CAS No. 119345-05-0). More specifically, XD-1000-L and XD-1000-22, available commercially from Nippon Kayaku, Ltd., Tokyo, Japan, may be used. Each of these resins is a copolymer of a glycidyl phenol with 3a,4,7,7a-tetrahydro-4,7-methano-1H-indene.

Other particularly desirable epoxy resins include the reaction product of 1,6-dihydroxynaphthalene and epichlorohydrin (CAS No. 27610-48-6) which is available commercially under the trade name EPICLON HP-4032D, from Dai Nippon Ink & Chemicals, Ltd. and the copolymer of (chloromethyl)oxirane, methyl phenol and naphthol (CAS No. 128192-21-2), available commercially under the trade name NC-7300L, from Nippon Kayaku.

Still other particularly desirable epoxy resins include the glycidyl ether of phenol-formaldehyde polymers available commercially under the tradename "EPOTOHTO" YDPN-658, from Tohto Kasei Co. Ltd. And of course combinations of the different epoxy resins are also desirable for use herein.

The rubber toughening agents are organic polymers, which are often elastomeric, and thus possess rubber properties. Examples of such agents include acrylic rubbers, polyester urethanes, ethylene-vinyl acetates, fluorinated rubbers, isoprene-acrylonitrile polymers, chlorosulfinated polyethylenes, and homopolyniers of polyvinyl acetate.

More specifically, the rubber-toughening agent may be selected from a wide range of rubbers, such as (a) homopolymers of alkyl esters of acrylic acid; (b) copolymers of lower alkenes, with an alkyl or alkoxy ester of acrylic acid; (c) copolymers of alkyl or alkoxy esters of acrylic acid; (d) copolymers of styrene, butadiene, and/or acrylonitrile; and combinations thereof. Additional polymerizable unsaturated monomers which may be copolymerized with the alkyl and alkoxy esters of acrylic acid include dienes, polymerizable halogen-containing olefins and alkylies and acrylamides. For instance, core-shellrubbers [see e.g. in the context of (meth)acrylate chemistry U.S. Pat. No. 4,942,201 (Briggs) and U.S. Pat. No. 5,112,691 (Briggs)], polymers and copolymers of vinyl ethers, maleates, fumarates asmonomers, urethane elastomers, polyester elastomers, butyl rubbers and other elastomers that are typically used to toughen adhesives are well suited, as are acrylonitrile-butadiene-styrene terpolymers, styrene-isoprene copolymers and the like.

Of the acrylic rubbers, copolymers of methyl acrylate and ethylene, manufactured by Du Pont, under the tradename of VAMAC, such as VAMAC N123 and VAMAC B124, are desirable.

Other desirable acrylic rubbers include copolymers of ethyl acrylate and 2-chloroethyl vinyl ether in a molecular ratio of about 95:5, respectively. One such acrylic rubber is manufactured by B.F. Goodrich Company, and is sold under the tradename HYCAR, such as HYCAR 4021.

Of the styrene-butadiene copolymer rubber toughening agents, "STEREON" 840A, commercially available from Firestone Synthetic Rubber, is particularly desirable. "STEREON" 840A is a copolymer of butadiene and styrene.

Another particularly desirable rubber toughening agent is available commercially from Nippon Shokubai Co., Ltd., under the tradename "EPOSET", such as "EPOSET" BPF307. This product is an acrylic rubber dispersed in the diglycidyl ether of bisphenol F (CAS Nos. 25767-43-5 and 28064-14-4).

Yet another particularly desirable rubber toughening agent is available commercially under the tradename "STANTONE" 90-EPX-04 from Harwick Chemical Corporation. This product is a 20% dispersion of medium jet furnace black (CAS No. 1333-86-4) in bisphenol A-epichlorohydrin resin copolymer (CAS No. 25068-38-6).

The amount of rubber toughening agent chosen should range from about 0.5% by weight to about 20% by weight, such as about 1.5% by weight to about 15% by weight, based on the weight of the composition.

The choice of the rubber-toughening agent may influence various properties and characteristics of the sealant composition, and such choices are well within the knowledge of those persons of ordinary skill in the art.

As the latent curing agent, a variety of materials may be chosen including anhydride compounds, amine compounds, amide compounds, imidazole compounds, modified amine compounds, modified imidazole compounds, and conventional cationic cure initiators and latent cationic cure initiators.

Appropriate anhydride compounds for use herein include mono- and poly-anhydrides, such as hexahydrophthalic anhydride ("HHPA") and methyl hexahydrophthalic anhydride ("IMHHPA") (commercially available from Lindau Chemicals, Inc., Columbia, South Carolina, used individually or as a combination, which combination is available under the trade designation "LINDRIDE" 62C) and 5-(2,5-dioxotetrahydrol)-3-methyl-3-cyclohexene-1,2-dicarboxylic anhydride (commercially available from ChrisKev Co., Leewood, Kans. under the trade designation B-4400). In addition, "MTA-15" (mixture of glycol tris-anhydrotrimelitate and MHHPA, commercially available from New Japan Chemical Co., Ltd.) and "MH-700" (MHHPA, commercially available from New Japan Chemical Co., Ltd.) are particularly desirable choices.

Of course, combinations of these anhydride compounds are also desirable for use in the compositions of the present invention.

Examples of the amine compounds include aliphatic polyamines, such as diethylenetriamine, triethylenetetramine and diethylaminopropylamine; aromatic polyamines, such as the aromatic amine-type curing agents, such as those available commercially under the tradenames "KAYA-HARD" A—A (from Nippon Kayaku Co., Ltd., Tokyo, Japan) or "ETHACURE" 100 (from Albemarie Corporation), and m-xylenediamine and diaminodiphenylamine; and alicyclic polyamines, such as isophoronediamine and menthenediamine. Other examples of the amine compounds include "ANCAMINE" 2049 [3,3'-di methylmethylene di(cyclohexanamine)], available commercially from Air Products and Chemicals, Inc., and "ARADITE" H7932 (combination of 4,4'-diamino diphenyl methane, and aromatic polyamines), available commercially from Ciba Specialty Chemicals.

Of course, combinations of these amine compounds are also desirable for use in the compositions of the present invention.

Examples of the amide compounds include cyanofunctionalized amides, such as dicyandiamide. For instance, "EPICURE" DICY 7MD, which is a dicyandiamide dispersed in dicycidyl ether of bisphenol A, available commercially from Japan Epoxy Resins, Co., Ltd.

Examples of the imidazole compounds include imidazole, isoimidazole, and substituted imidazoles—such as alkyl-substituted imidazoles (e.g., 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 2-heptadecylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole and the like, generally where each alkyl substituent contains up to about 17 carbon atoms and desirably up to about 6 carbon atoms), and aryl-substituted imidazoles (e.g., phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4, 2-naphthyl-4,5-diphenylimidazole, 1-benzyl-2-methylimidazole, 2-p-methoxystyrylimidazole, and the like, generally where each aryl substituent contains up to about 10 carbon atoms and desirably up to about 8 carbon atoms].

Examples of commercial imidazole compounds are available from Air Products, Allentown, Pa. under the trade designation "CUREZOL" 1B2MZ, "CUREZOL" 2E4MZ-CN (1-cyanoethyl-2-ethyl-4-methyl imidazole, CAS No. 23996-25-0) and from Synthron, Inc., Morganton, N.C. under the trade designation "ACTIRON" NXJ-60. Another example of a commercially available imidazole compound is the latent curative, "NOVACURE" HX-3721, composed of imidazole derivatives and diglyidyl ether of bisphenol A, from Asahi Kasei Epoxy Co., Ltd.

Of course, combinations of these imidazole compounds are also desirable for use in the compositions of the present invention.

Examples of the modified amine compounds include epoxy amine additives formed by the addition of an amine compound to an epoxy compound, and examples of the modified imidazole compounds include imidazole adducts formed by the addition of an imidazole compound to an epoxy compound.

A commercially available latent curative particularly useful herein is "AJICURE" PN-23 (CAS No. 134091-76-2, an epoxy/amine adduct, such as adducts obtained by reacting a compound having an active hydrogen together with a tertiary amino group in the molecule, and epoxy compound and a carboxylic acid anhydride) available commercially from Ajinomoto Fine Techno Co., Ltd., Tokyo, Japan.

The latent curative should be present in an amount within the range of about 1% by weight to about 90% by weight, desirably about 20% by weight to about 60% by weight, such as about 40% by weight to about 50% by weight, based on the total composition, with the amount depending on the type and identity of the curing agent chosen.

As the coupling agent or adhesion promoter, many materials are available to enhance adhesion on one or more substrates. Conventional coupling agents for use here include alkoxy silanes, such as δ-glycidoxypropyl trimethoxy silane ("A-187", CAS No. 2530-83-8).

The compositions may also include an inorganic filler component, such as reinforcing silicas, like fused silicas, and may be untreated or treated so as to alter the chemical nature of their surface. Virtually any reinforcing fused silica may be used.

Particularly desirable silicas have a low ion concentration and are relatively small in particle size (e.g., in the range of about 2–10 microns, such as on the order of about 2 microns), such as the one commercially available from Admatechs, Japan under the trade designation SO-E5.

Other desirable materials for use as the inorganic filler component include those constructed of or containing aluminum oxide, silicon nitride, aluminum nitride, silica-coated aluminum nitride, boron nitride and-combinations thereof.

When used, the inorganic filler component may be present in an amount within the range of about 5% by weight to about 75% by weight, desirably about 20% by weight to 60% by weight, such as about 40% by weight to about 50% by weight of the total composition.

The inventive composition are designed to cure under elevated temperature conditions, such as within the range of about 125° C. to about 150° C. The compositions may be cured alternatively through exposure to radiation in the electromagnetic spectrum, such as photocuring when exposed to UV, IR and/or VIS radiation, E-beam curing, and/or radio frequency curing. The compositions may also be cured using a combination of these techniques, which are well known to those of skill in the art.

The electrochromic medium, against which the inventive compositions are intended to seal ingress and egress often includes anodic electrochromic compounds, cathodic electrochromic compounds, each of which are well known to those persons of ordinary skill in the art and typically are organic or organometallic compounds, and a solvent.

The anodic electrochromic compounds and cathodic electrochromic compounds are chosen so as to achieve a desired color when the electrochromic composition is colored to a dimmed state.

Solvents typically chosen for electrochromic media include acetonitrile, 3-hydroxypropionitrile, methoxypropionitrile, 3-ethoxypropionitrile, 2-acetylbutyrolactone, propylene carbonate, cyanoethyl sucrose, butyrolactone, 2-methylglutaronitrile, N,N'-dimethylformamide, 3-methylsulfolane, glutaronitrile, 3,3'-oxydipropionitrile, methylethyl ketone, cyclopentanone, cyclohexanone, benzyl acetone, 4-hydroxy-4-methyl-2-pentanone, acetophenone, 2-methoxyethyl ether, triethylene glycol dimethyl ether, glacial acetic acid, hydrogen halide gases in solution, perchloric acid, weak organic acids, like citric acid solutions in otherwise non-acidic solvents, and combinations thereof.

Other components often added to electrochromic media include known ultraviolet stabilizing agents, known electrolytic materials and combinations thereof.

While the solvent for solubilizing the anodic electrochromic compounds and cathodic electrochromic compounds is often chosen with the intent that it remain substantially inert to those compounds, as well as to any other constituent initially present in the electrochromic media as used in the assembly of electrochromic devices, in practice that is typically not the case. That is, while the chosen solvent solubilizes the anodic electrochromic compound and cathodic electrochromic compounds, the anodic electrochromic compound and/or the cathodic electrochromic compound (and by-products thereof such as from electrolysis) and the solvent (and by-products thereof) may encourage salting-out or precipitation from the solution, and the acidic nature of many of these components tend to interfere with the appearance and the effectiveness of the electrochromic device as well as the ability of the device .(and its constituent parts) to withstand degradation from chemical and physical, such as environmental exposure. This is obviously disadvantageous.

FIG. 1 shows an electrochromic device assembled with the compositions of the present invention. The electrochromic assembly 1 includes two substantially planar substrates 2,3 positioned substantially parallel to one another.

Referring to FIG. 1, the seal 5 is shown to space or separate the ITO-coated glass substrates 2,3 from one another. In addition, the seal 5 is intended to prevent egress of the electrochromic solution (not shown) from the cell cavity or, for that matter, ingress of environmental contaminants into the cell cavity. The seal 5 is constructed from the inventive compositions, which is cured in accordance with the instant teaching to form a robust seal.

The thickness of the seal 5 may vary from about 10 um to about 1,000 um, such as about 50 um to about 100 um. The thickness of the seal 5 determines the thickness of the interpane space created between the glass substrates 2,3 by the seal 5—i.e., the cell gap. The thickness of course is a matter of design choice left to those of ordinary skill in the art.

In one known method of filling the cell 1 the inventive composition may be dispensed onto one or both of the substrates 2,3 and cured by exposure to elevated temperature conditions to form a solid. A small gap may be allowed to remain in the so-formed seal 5 so that an electrochromic solution may be placed into the cell cavity during a conventional vacuum backfilling process. The gap may be formed by dispensing the inventive composition so that a gap remains before curing creating a gap after the composition is cured. In the vacuum backfilling process, the empty electrochromic device may be placed in a chamber having reduced atmospheric pressure therein—i.e., about 1 mm Hg or lower. A container of the electrochromic solution should also be placed in this chamber so that it may fill the cell cavity through the fill hole. The fill hole of the device may then be lowered just beneath the surface of the solution in the container. When the chamber is vented to atmospheric pressure, the electrochromic solution is thereby forced into the cell cavity and consequently fills it.

Alternatively, the cell may be constructed by dispensing the inventive composition onto one or both of the glass substrates 2,3, and mating the substrates in appropriate alignment with one another. This construction is then temporarily clamped together, and heated in an oven at a temperature of about 25° C. to about 150° C. to cure the so-dispensed inventive composition to form the seal 5 that will keep intact the integrity of the cell housed in the device.

Once assembled and filled, an applied potential may be introduced to the device by the bus bars 4 in order to induce solution coloring.

A source of an applied potential need be introduced to the electrochromic assembly 1 so that electrochromic media may color in a rapid, intense and uniform manner. That source may be connected by electrical leads 4 to conducting strips, such as bus bars 4. The bus bars 4 may be constructed of a metal, such as copper, stainless steel, aluminum or solder, or of conductive frits and epoxides, and should be affixed to a conductive coating (not shown), coated on a surface of each of the substrates 2,3. An exposed portion of the conductive coating should be provided for the bus bars 4 to adhere by the displacement of the coated substrates 2,3 in opposite directions relative to each other.

The substrates employed in the electrochromic devices of the present invention are oftentimes constructed from materials that are substantially inflexible as well as flexible depending on the application to which they are to be used. The substrates may be constructed from substantially inflexible substrates, such as glass, laminated glass, tempered glass, optical plastics, such as polycarbonate, acrylic and polystyrene, and flexible substrates, such as "MYLAR" film.

Whether the chosen substrate is substantially inflexible or flexible, a transparent conductive coating, such as indium tin oxide ("ITO") or doped-tin oxide, is coated on a surface of the substrate. Thus the inventive composition is capable of forming an adhesive seal against such coatings on the substrates.

As noted above, coated on a surface of each of these substrates 2,3 is a substantially transparent conductive coating. The conductive coating 4 is generally from about 300 Å to about 10,000 Å in thickness, having a refractive index in the range of about 1.6 to about 2.2.

The substrates 2,3 may be selected from among those commercially available as glass substrates, coated with indium tin oxide ("ITO") from Donnelly Corporation, Holland, Mich., or tin oxide-coated glass substrates sold by the LOF Glass division of Libbey-Owens-Ford Co., Toledo, Ohio under the tradename of "TEC-Glass" products, such as "TEC 10" (10 ohms per square sheet resistance), "TEC 12"

(12 ohms per square sheet resistance) and "TEC 20" (20 ohms per square sheet resistance) tin oxide-coated glass. Moreover, tin oxide coated glass substrates, commercially available from Pittsburgh Plate Glass Industries, Pittsburgh, Pa. under the "SUNGATE" tradename, may be advantageously employed herein. Also, substantially transparent conductive coated flexible substrates, such as ITO deposited onto substantially clear or tinted "MYLAR", may be used. Such flexible substrates are commercially available from Southwall Corp., Palo Alto, Calif.

The conductive coating coated on each of the substrates 2,3 may be constructed from the same material or different materials, including tin oxide, ITO, ITO-full-wave length-type, ITO-Half-wave length-type, ITO-half-wave length green-type, doped tin oxide, such as antimony-doped tin oxide and fluorine-doped tin oxide, doped zinc oxide, such as antimony-doped zinc oxide and aluminum-doped zinc oxide, with ITO being preferred.

It is clear from the teaching herein that should a window, sun roof or the like be desirably constructed, the reflective coating need only be omitted from the assembly so that the light which is transmitted through the transparent panel is not further assisted in reflecting back therethrough.

Once constructed, any of the electrochromic devices described herein may have a molded casing placed there around. This molded casing may be pre-formed and then placed about the periphery of the assembly or, for that matter, injection molded there around using conventional techniques, including injection molding of thermoplastic materials, such as molded there around using conventional techniques, including injection molding of thermoplastic materials, such as polyvinyl chloride [see e.g., U.S. Pat. No. 4,139,234 (Morgan)], or reaction injection molding of thermosetting materials, such as polyurethane or other thermosets [see e.g., U.S. Pat. No. 4,561,625 (Weaver)].

The following examples illustrate the benefits and utility of the present invention and are provided only for purposes of illustration, and are not to be construed so as to limit in any way the teaching herein.

EXAMPLES

Preparation of Epoxy-based Composition

Epoxy-based compositions were prepared for evaluation as a main seal in an electrochromic mirror as set forth in Table 1.

TABLE 1

| Component | | Sample Nos./Amt. (Wt. %) | | | | | | | | |
|---|---|---|---|---|---|---|---|---|---|---|
| Type | Identity | 1 | 2 | 3 | 4 | 5 | 6 | 7 | 8 | 9 |
| Epoxy | RE-403S | 36.9 | — | — | — | — | — | — | — | — |
| | EPICLON EXA-830LVP | — | 21.5 | 23.4 | 10.3 | 21.3 | 19.2 | 13.0 | — | 8.6 |
| | EPICLON EXA-850CRP | — | — | — | — | — | — | — | 21.5 | — |
| | XD-1000-2L | 12.4 | — | — | — | 46.2 | 46.6 | 41.4 | — | 46.4 |
| | NC-7300L | 12.4 | — | — | — | — | — | — | — | — |
| | EPICLON HP-4032D | — | 25.9 | 10.0 | — | — | — | — | — | — |
| | EPOTOHTO YDPN638 | — | 17.4 | 18.0 | 45.0 | — | — | — | 42.0 | — |
| Rubber toughening agent | EPOSET BPF307 | — | — | 12.2 | 12.0 | 14.0 | 13.0 | 13.0 | — | 13.0 |
| Adhesion promoter | A-187 | 3.9 | 2.0 | 2.8 | 2.8 | 2.8 | 2.0 | 2.0 | 1.0 | 2.8 |
| Pigment | STAN-TONE 90-EPX-04 | 1.2 | — | — | — | — | — | — | — | — |
| | MA-100 | — | 0.4 | 0.4 | 0.4 | 0.4 | 0.4 | 0.4 | 0.4 | 0.4 |
| Filler | ADMAFINE SO-C1 | — | — | 28.2 | — | — | — | — | — | — |
| | FUSELEX X | 27.0 | 27.0 | — | 10.0 | 10.0 | 10.0 | 10.0 | 10.0 | 10.0 |
| | AEROSIL R202 | 1.2 | 0.8 | — | 1.0 | 1.2 | 1.2 | 1.2 | 1.0 | 1.0 |
| Curative | KAYAHARD A-A | — | — | — | — | — | — | — | 24.1 | 10.6 |
| | ETHACURE 100 | — | — | — | — | — | — | — | — | 7.2 |
| | EPICURE DICY7MB | — | — | — | 16.5 | — | — | — | — | — |
| | NOVACURE HX-3721 | — | — | — | 2.0 | — | — | — | — | — |
| | ANCAMINE 2049 | — | — | — | — | — | 4.6 | — | — | — |
| | ARADITE HY932 | — | — | — | — | — | — | 19.0 | — | — |
| | CUREZOL 2E4MZ-CN | 2.0 | 2.0 | 2.0 | — | 4.1 | 3.0 | — | — | — |
| | AJICURE PN-23 | 3.0 | 3.0 | 3.0 | — | — | — | — | — | — |

Mirrors Assembled with Epoxy-based Compositions

Mirrors suitable for use as automotive electrochromic mirrors were assembled from glass substrates. Onto the edges of one or both of the substrates was dispensed the epoxy compositions identified in Table 1 to form the main seal. The seal dimensions were 25×65 mm with a small open area left, the width was 1.8 mm, and the gap between substrates was 100 um. The main seal was cured by heat at a temperature of about 150° C. Then liquid electrochromic material was vacuum filled in through the small open area, and the small-open area was end sealed with Loctite 352.

The assembled mirrors were introduced to autoclave conditions (a temperature of 121° C. and 100% RH) to observe the performance of the mirrors under such conditions. Around 10 assembled mirrors were used for the evaluation. The results are depicted graphically in FIG. 2.

Figure 2:
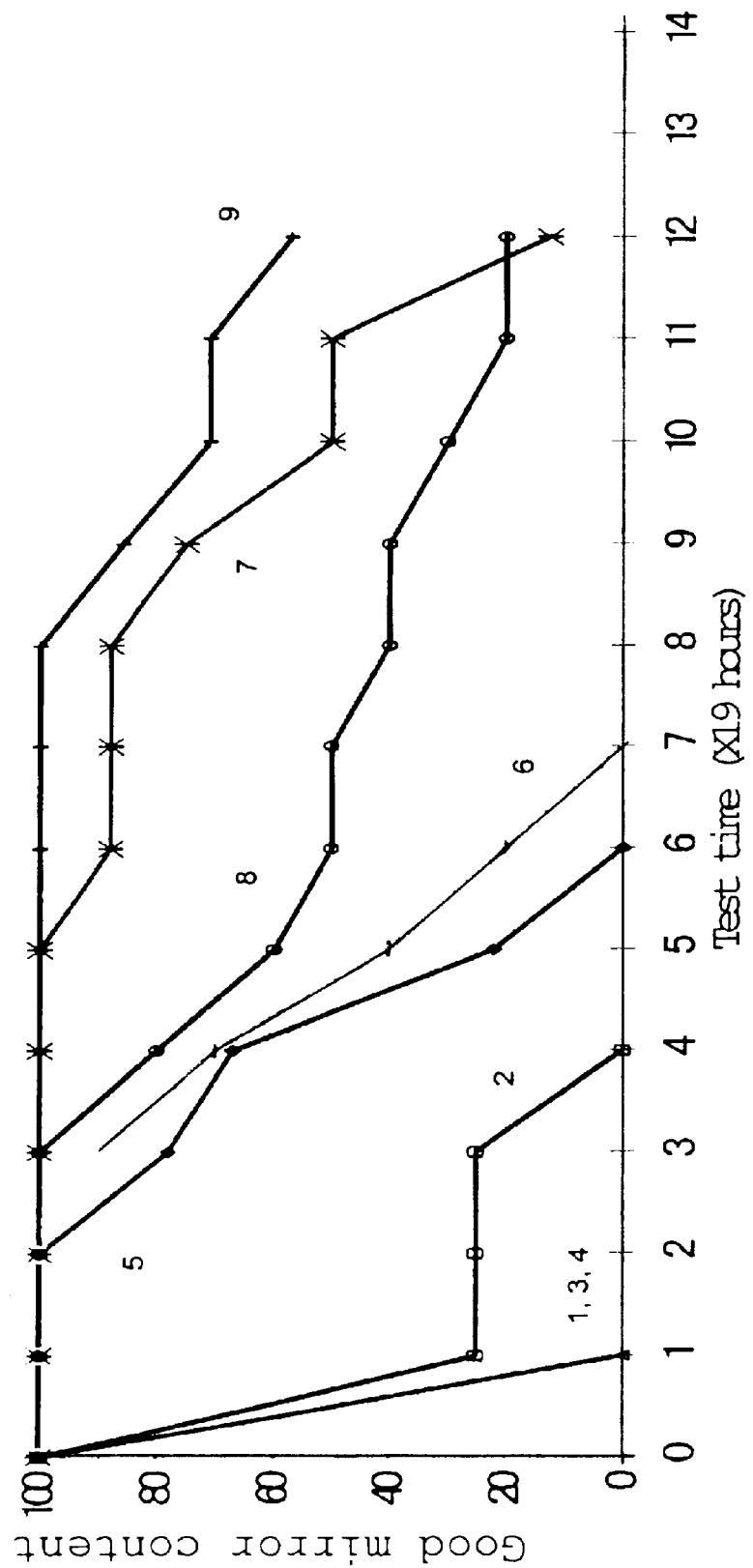
FIG. 2 depicts a plot,of the ability of an electrochromic mirror assembled with the inventive compositions, to withstand autoclave conditions over time compared with a set specification.

Reference to FIG. 2 shows each of the samples listed in Table 1, which have been used to seal electrochromic mirrors, as a function of test cycle. The conditions under which the testing was conducted included a temperature of 121° C. with a relative humidity of 100 for every 19 hours test cycle.

After each cycle test, the electrochromic mirrors were removed and observed for any bonding failure, leakage of electrochromic material, deviation in refractive index and overall cosmetic acceptability. These observations were made with respect to a set specification.

Failure of mirrors sealed with Sample Nos. 1, 2, 3, and 4 was observed at even 1 cycle test. For instance, the seal of Sample No. 1 was pushed out, and the seal of Sample No. 4 broke after the test. Improved results were observed with Sample Nos. 5 and 6. Sample Nos. 7, 8 and 9 showed further improved results. Mirrors sealed with Sample No. 9 can withstand over 8 cycle tests, while retaining long pot life, particularly as compared to Sample No. 6, and relatively low toxicity as compared to modified Sample No. 7.

The true scope of the invention is measured by the claims.

What is claimed is:

1. An epoxy composition, comprising
   (a) an epoxy resin component, at least a portion of which comprises a combination of dicyclopentadiene epoxy resin and reaction products of 1,6-dihydroxynaphthalene with epichlorohydrin;
   (b) an acrylic rubber toughening agent; and
   (c) a latent curative.

2. The composition according to claim 1, wherein the latent curative is a member selected from the group consisting of anhydride compounds, amide compounds, amide compounds, imidazole compounds, modified amine compounds, modified imidazole compounds, and cationic cure initiators and latent cationic cure initiators.

3. The composition according to claim 1, wherein the acrylic rubber toughening agent is a member selected from the group consisting of (a) homopolymers of alkyl esters of acrylic acid; (b) copolymers of lower alkenes, with an alkyl or alkoxy ester of acrylic acid; (c) copolymers of alkyl or alkoxy esters of acrylic acid; and combinations thereof.

4. An epoxy composition consisting essentially of:
   (a) an epoxy resin component, at least a portion of which comprises a combination of dicyclopentadiene epoxy resin and reaction products of 1,6-dihydroxynaphthalene with epichlorohydrin;
   (b) a rubber toughening agent; and
   (c) a latent curative.

5. An article of manufacture assembled with the epoxy composition according to claim 1.

6. The article of manufacture according to claim 5, selected from the group consisting of electrochromic mirrors, electrochromic glazings, electrochromic privacy or security partitions, electrochromic solar panels, electrochromic information displays, electrochromic lenses and eye glass.

7. The composition according to claim 1, wherein the acrylic rubber toughening agent is present in an amount within the range of from 0.5% by weight to about 20% by weight.

8. The composition according to claim 1, wherein the latent curative is present in an amount within the range of from 1% by weight to about 90% by weight.

9. The composition according to claim 1, wherein the epoxy resin is present in an amount within the range of from 10% by weight to about 75% by weight.

10. The composition according to claim 1, further comprising an adhesion promoter.

11. The composition according to claim 4, wherein the rubber toughening agent is selected from the group consisting of polymers and copolymers of vinyl ethers, maleates, and fumarates as monomers, urethane elastomers, polyester elastomers, butyl rubbers, and copolymers of styrene or butadiene, or styrene and butadiene, each with acrylonitrile.

12. The composition according to claim 4, wherein the rubber toughening agent is selected from the group consisting of core shell polymers, copolymers of ethyl acrylate and 2-chloroethyl vinyl ether in a molecular ratio of about 95:5, copolymers of butadiene and styrene, terpolymers of acrylonitrile, butadiene and styrene, copolymers of butadiene and styrene, and copolymers of isoprene and styrene.

13. The composition according to claim 4, wherein the rubber toughening agent is a 20% dispersion of medium jet furnace black in bisphenol A-epichlorohydrin resin copolymer.

14. The composition according to claim 4, wherein the epoxy resin component further comprises at least one of bisphenol A epoxy resin, bisphenol F epoxy resin, and novolac epoxy resin.

* * * * *